United States Patent [19]
Algreen-Ussing

[11] Patent Number: 5,489,154
[45] Date of Patent: Feb. 6, 1996

[54] METHOD AND APPARATUS FOR MIXING GASES

[75] Inventor: Søren Algreen-Ussing, Frederiksberg, Denmark

[73] Assignee: Haldor Topsøe A/S, Denmark

[21] Appl. No.: 368,982

[22] Filed: Jan. 5, 1995

[30] Foreign Application Priority Data

Jan. 12, 1994 [DK] Denmark ..................... 0053/94

[51] Int. Cl.⁶ .................................... B01F 5/06
[52] U.S. Cl. .................................... 366/338
[58] Field of Search ................... 366/336, 337, 366/338, 339, 340, 348, 349, 165.1, 165.2; 138/38, 42

[56] References Cited

U.S. PATENT DOCUMENTS

| | | | |
|---|---|---|---|
| 2,815,532 | 12/1957 | Braunlich | 366/336 |
| 4,560,284 | 12/1985 | Chen | 366/336 |
| 4,614,440 | 9/1986 | King | 366/336 |
| 5,232,283 | 8/1993 | Goebel | 366/336 |

*Primary Examiner*—Robert W. Jenkins
*Attorney, Agent, or Firm*—Ostrolenk, Faber, Gerb & Soffen

[57] ABSTRACT

In a method for cooling a process gas with a cooling gas being admixed into the process gas, wherein one or more streams of the cooling gas are injected into one or more streams of the process gas and the streams of the obtained gas mixture being brought into a spiral movement in a cylindrical mixing chamber with a central distribution chamber and being further provided with a number of spiral blades mounted on the distribution chamber and having perforations, so that each stream of the gas mixture periodically is divided into a number of substreams with a radial flow direction through the perforations of the blades towards the distribution chamber and into a number of substreams with a tangential flow directions along the blades towards the distribution chamber, and the substreams are recombined in the distribution chamber.

2 Claims, 1 Drawing Sheet

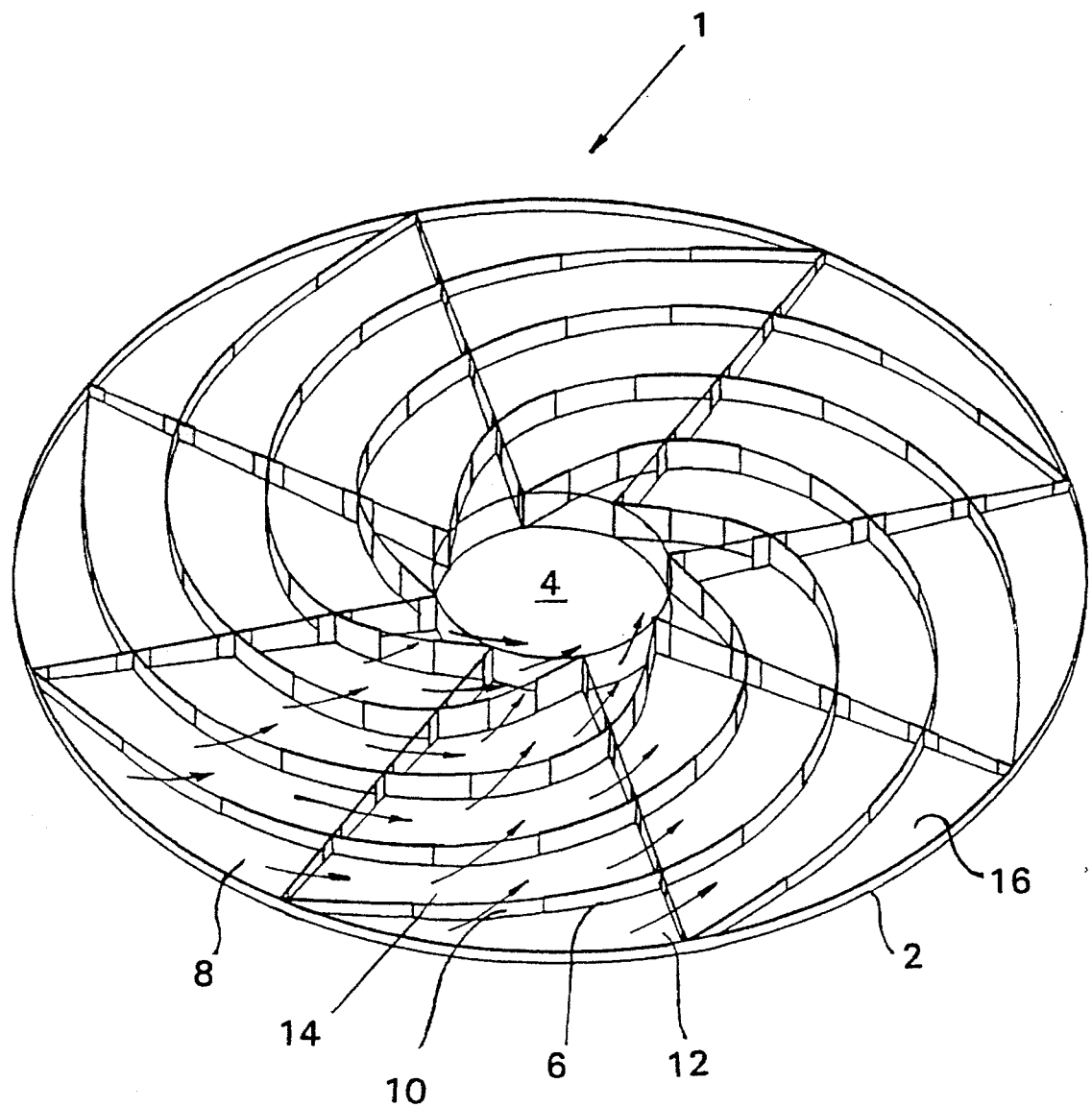

METHOD AND APPARATUS FOR MIXING GASES

BACKGROUND OF THE INVENTION

The present invention relates to a method for mixing gases being at different conditions. The invention further concerns a mixer for use in the mixing of gases.

Mixing of gases is usually carried out in static mixers. Mixers of that type conventionally comprise cross corrugated guide surfaces or mixer blades with helical or screw threaded form being rigidly mounted in a tubular enclosure.

A gas stream is, thereby, mixed with another gas-stream in a turbulent flow in a plurality of substreams being injected into each other at a certain angle or being combined in a swirling flow motion to a homogeneous gas mixture.

A drawback of the known methods and mixers of the above type is a large space necessarily used for obtaining turbulent or swirling flow motion. When gases are mixed in a reactor extra space within the expensive pressure shell is necessary for mixing.

It has now surprisingly been found that mixing of gases may be carried out within a rather narrow space by mixing different gases as a level matrix obtained by dividing the gases continuously in a plurality of substreams directing the substream in different flow directions towards a collecting or distribution chamber.

SUMMARY OF THE INVENTION

Accordingly, this invention provides a method for mixing a process gas with a cooling gas being admixed into the process gas, wherein one or more streams of the cooling gas are injected into one or more streams of the process gas and the streams of the gas mixture obtained thereby being brought into a spiral movement in a cylindrical mixing chamber with a central distribution chamber and being further provided with a number of spiral blades mounted on the distribution chamber and having perforations, so that each stream of the gas mixture periodically is divided into a number of substreams with a radial flow direction through the perforations of the blades towards the distribution chamber and into a number of substreams with a tangential flow directions along the blades towards the distribution chamber, and the substreams are recombined in the distribution chamber.

The invention provides furthermore a static mixer, which is useful for carrying out the above process. The mixer of the invention comprises within a cylindrical shell, a distribution chamber concentrically arranged within the shell, a horizontal guide blade fitting the cross-sectional area of an annular chamber between a distribution chamber and the shell of the mixer, the mixing chamber being provided with a number of spiral blades mounted on the guide plate and extending from the distribution chamber to the mixing chamber shell, which spiral blades are adapted to divide an incoming gas mixture into a plurality of substreams with a radial direction through the perforations of the blades and with a tangential direction along the blades towards the central distribution chamber.

BRIEF DESCRIPTION OF THE DRAWING

The sole FIGURE is a semi-diagrammatic view of a static mixer according to a specific embodiment of the invention.

The above objects and features of the invention will become more apparent from the following detailed description with reference to the drawing.

DESCRIPTION OF THE PREFERRED EMBODIMENT

In the Figure, static mixer 1 consists of a distribution chamber concentrically arranged within cylindrical shell 2. An annular space between chamber 4 and shell 2 is divided in a number of mixing chambers 16 being confined within spiral blades 6 and guide plate 8.

When employed in the cooling of a process gas in a catalytic reactor, the mixer will usually be arranged between two catalyst beds, wherein catalyst particles of a top bed rest on a screen (not shown) covering the cross sectional area on top of mixer 1.

Hot process gas leaving the catalyst bed enters into mixing chambers 16 and is mixed with a cooling gas being injected into the chambers from a ring yet at the periphery of the mixer. Having entered the mixing chambers, the gases are mixed and homogenized when passing towards distribution chamber 4 in a plurality of substreams with a tangential flow direction (shown by arrow 11) along spiral blade 6 and in a radial flow direction (shown by arrow 14) through openings 10 in spiral blades 6. Thereby, the substreams are remixed whenever a tangential substream meets a radial substream in mixing chambers 16, and a substantial homogeneous gas stream enters into distribution chamber 4. In the above catalytic reactor, homogenized gas will be distributed from chamber 4 to a bottom catalyst bed beneath mixer 1, optionally through a wire mesh gauze at the bottom of the mixer.

I claim:

1. In a method for cooling a process gas with a cooling gas being admixed into the process gas, wherein one or more streams of the cooling gas are injected into one or more streams of the process gas and the streams of the obtained gas mixture being brought into a spiral movement in a cylindrical mixing chamber with a central distribution chamber and being further provided with a number of spiral blades mounted on the distribution chamber and having perforations, so that each stream of the gas mixture periodically is divided into a number of substreams with a radial flow direction through the perforations of the blades towards the distribution chamber and into a number of substreams with a tangential flow directions along the blades towards the distribution chamber, and the substreams are recombined in the distribution chamber.

2. A static mixer for use in the mixing of different gas stream, comprising within a cylindrical shell, a distribution chamber concentrically arranged within the shell, a horizontal guide blade fitting the cross-sectional area of an annular chamber between a distribution chamber and the shell of the mixer, the mixing chamber being provided with a number of spiral blades mounted on the guide plate and extending from the distribution chamber to the mixing chamber shell, which spiral blades are adapted to divide an incoming gas mixture into a plurality of substreams with a radial direction through the perforations of the blades provided with perforation and with a tangential direction along the blades towards the central distribution chamber.

* * * * *